UNITED STATES PATENT OFFICE.

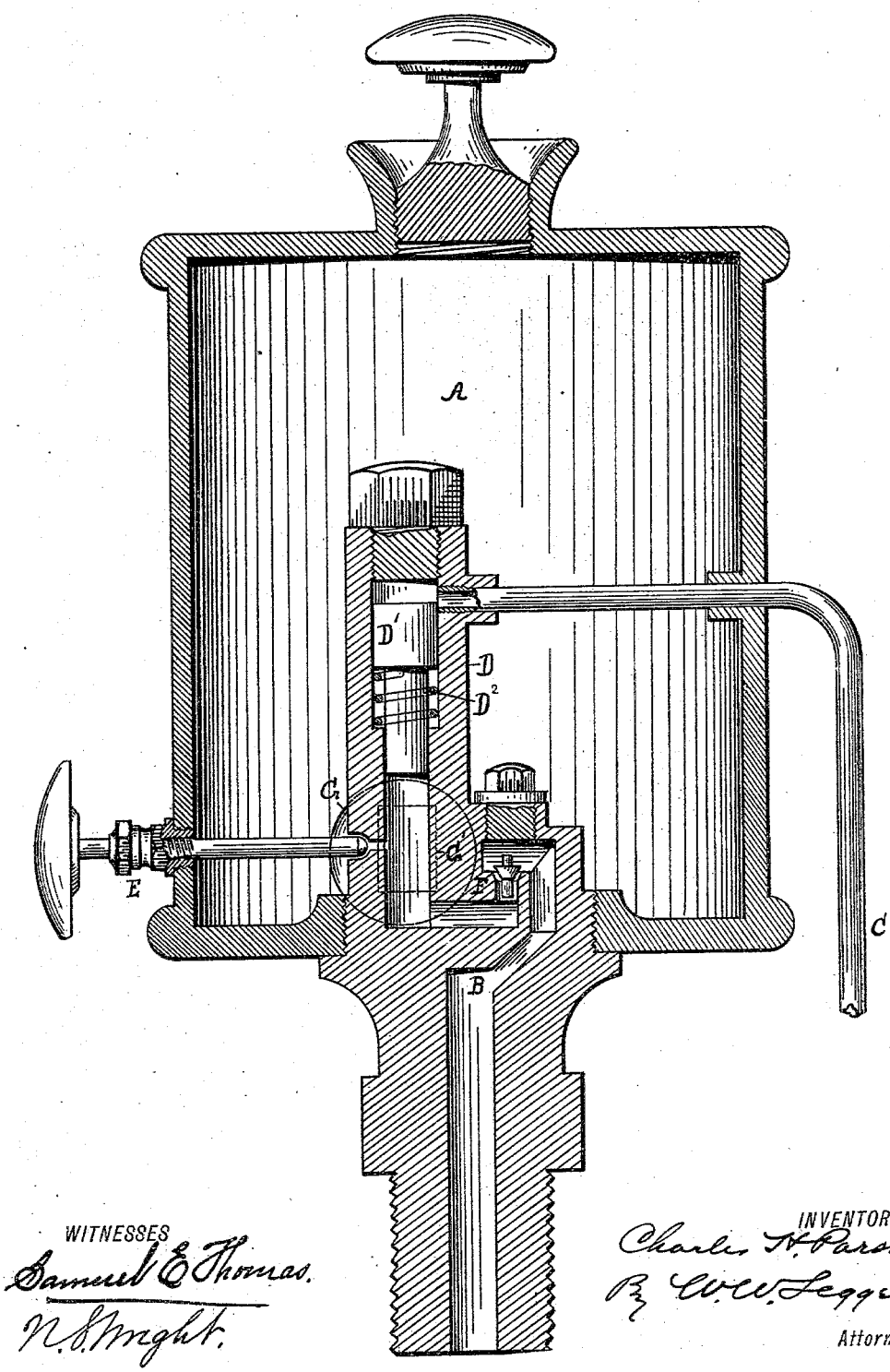

CHARLES H. PARSHALL, OF DETROIT, MICHIGAN, ASSIGNOR TO THE MICHIGAN LUBRICATOR COMPANY, OF SAME PLACE.

LUBRICATOR.

SPECIFICATION forming part of Letters Patent No. 296,213, dated April 1, 1884.

Application filed October 17, 1882. Renewed February 21, 1884. (No model.)

*To all whom it may concern:*

Be it known that I, CHARLES H. PARSHALL, of Detroit, county of Wayne, State of Michigan, have invented a new and useful Improvement in Lubricators; and I declare the following to be a full, clear, and exact description of the same, such as will enable others skilled in the art to which it pertains to make and use it, reference being had to the accompanying drawing, which forms a part of this specification.

My invention consists in the combinations of devices and appliances hereinafter specified, and more particularly pointed out in the claims.

In the drawing is presented a view in section and elevation of a lubricator embodying my invention.

It is the object of my invention to furnish a reliable lubricator for steam-cylinders and other devices in which the lubricant has to be admitted against a resisting-pressure; to furnish at the same time a device which shall operate without the maintenance of that pressure within the body of the lubricator; and, finally, one which shall operate by steam or other pressure without accumulations of condensed water within the reservoir.

To this end, A represents the body of the oil-reservoir. B is the stem whereby it is connected with the steam-chest.

C is a pipe connecting the steam-port between the steam-chest and the cylinder. This pipe C connects with the plunger-cylinder D within the body of the lubricator. Within this plunger-cylinder D is a plunger, D', which has a larger head at its top than is presented at its lower end. This plunger D' is designed to be forced downward by steam-pressure, as hereinafter described, but is retracted in any suitable manner—as, for instance, by a spring, $D^2$—although ordinarily the vacuum produced in the pipe C as steam is alternately cut off will suffice to lift this plunger back to its starting-point.

E is a regulating-valve for governing the flow of the oil from the reservoir.

F is a valve which shuts with pressure from the steam-chest.

The operation of the device is as follows: The pipe C, since it leads from a steam-port between the steam-chest and the cylinder, takes steam alternately as the cut-off valve moves back and forth. When steam enters this pipe, it passes into the chamber D in the lubricator and exerts a sudden pressure upon the upper large end of the plunger D'. This forces the plunger down and drives a quantity of oil out past the valve F, and thence to the steam-chest. As soon, however, as the cut-off or main valve has cut off the steam from the pipe C, the spring $D^2$, or the vacuum within the pipe C, causes the plunger D' to reseat to its normal or upper position. As it reseats, the pressure of steam from the steam-chest causes the valve F to close, and oil is sucked into the plunger-cylinder past the valve E, to be again driven down to the steam-chest as the steam again enters the pipe C. In this way it is apparent that steam does not enter the body of the lubricator, yet is always present in the pipe C, the plunger-cylinder, and in the supporting-stem sufficient to keep the contents warm and fluid. Condensed water cannot collect within the lubricator, and it is not necessary that it should be kept tightly closed. In fact, it should be slightly vented, in order to prevent the formation of a resisting-vacuum within the reservoir. This lubricator, it is apparent, pumps by positive action a regulated quantity of oil into the steam-chest at each stroke of the piston; but when the piston is at rest the oil ceases to feed.

The reservoir may be provided with the usual gage-glass, to indicate the height of oil; but I prefer to locate simply a flat or circular disk of glass, G, in the side of the reservoir, and a corresponding glass face, G', opposite to the latter in the wall of the plunger-cylinder opposite the valve E, so that the engineer may at all times see that oil is properly feeding.

It is apparent that instead of leading the pipe C into a steam-port it may be led into any other similar chamber where it can receive alternate pressures of steam.

What I claim is—

1. A lubricator for steam-cylinders, consisting of a stem by which the lubricator may be connected with a steam-chest, and through which the oil is fed, a plunger-cylinder and plunger located within the reservoir, an orifice beneath the plunger for the inflow of oil, and a steam pipe or conduit leading from the plunger-cylinder above the plunger to a steam-port, substantially as described.

2. In a lubricator, the combination of an oil-reservoir, A, a plunger-cylinder, D, rising upward from the bottom of the reservoir, a plunger, D', arranged therein, a pipe, C, for connecting the upper portion of the plunger-cylinder with a source of steam for actuating the plunger, an orifice in the cylinder below the plunger which connects the same with the reservoir, and the regulating-valve E, controlling said orifice and extending outside the reservoir, substantially as described.

3. The combination, with the reservoir and interior plunger-cylinder, of a glass disk or plate located in the outer wall of the reservoir, and a similar plate located in the wall of the plunger-cylinder, substantially as described.

4. The combination, with the reservoir, the inner plunger-cylinder, its plunger, and the steam-pipe C, of a valve, F, adapted to close with pressure up through the stem, and with or without a regulating-valve, E, substantially as described.

In testimony whereof I sign this specification in the presence of two witnesses.

CHARLES H. PARSHALL.

Witnesses:
N. S. WRIGHT,
SAMUEL E. THOMAS.